US011606608B1

(12) United States Patent
Kalam

(10) Patent No.: US 11,606,608 B1
(45) Date of Patent: Mar. 14, 2023

(54) GAMIFICATION OF VIDEO CONTENT PRESENTED TO A USER

(71) Applicant: SLING MEDIA PVT LTD, Bangaluru (IN)

(72) Inventor: Arun Pulasseri Kalam, Karnataka (IN)

(73) Assignee: DISH Network Technologies India Private Limited

( * ) Notice: Subject to any disclaimer, the term of this patent is extended or adjusted under 35 U.S.C. 154(b) by 0 days.

(21) Appl. No.: 17/456,810

(22) Filed: Nov. 29, 2021

(51) Int. Cl.
 *H04N 21/442* (2011.01)
 *G06F 3/04815* (2022.01)
 *H04N 21/8545* (2011.01)
 *H04N 21/81* (2011.01)

(52) U.S. Cl.
 CPC ... *H04N 21/44218* (2013.01); *G06F 3/04815* (2013.01); *H04N 21/816* (2013.01); *H04N 21/8146* (2013.01); *H04N 21/8545* (2013.01)

(58) Field of Classification Search
 None
 See application file for complete search history.

(56) References Cited

U.S. PATENT DOCUMENTS

| | | | | |
|---|---|---|---|---|
| 8,100,766 B2* | 1/2012 | LeBlanc | | G07F 17/32 463/31 |
| 8,339,418 B1* | 12/2012 | Nesmith | | G06T 15/50 345/633 |
| 8,821,272 B2* | 9/2014 | Thomas | | A63F 13/792 463/30 |
| 10,786,736 B2* | 9/2020 | Weising | | A63F 13/422 |
| 2010/0144430 A1* | 6/2010 | Graham | | A63F 13/60 463/29 |
| 2013/0054319 A1* | 2/2013 | Woods | | G06F 3/04815 715/848 |
| 2013/0340001 A1* | 12/2013 | Cansler | | H04N 21/812 725/35 |
| 2018/0001200 A1* | 1/2018 | Tokgoz | | A63F 13/52 |
| 2019/0206129 A1* | 7/2019 | Khalid | | A63F 13/25 |
| 2020/0163571 A1* | 5/2020 | Pradeep | | A63F 13/10 |
| 2022/0103906 A1* | 3/2022 | Landow | | H04N 21/44222 |

* cited by examiner

*Primary Examiner* — Alexander Q Huerta
(74) *Attorney, Agent, or Firm* — KW Law, LLP

(57) ABSTRACT

Disclosed herein are a system and related operating method of providing video game functionality that is contextually linked with video program content. In certain implementations, the method involves the steps of: causing presentation of a video program at a presentation device; identifying a portion of the video program as a candidate for gamification; processing the identified portion into a video game segment that represents a gamified version of the identified portion; and causing presentation of the video game segment at a playback device.

16 Claims, 6 Drawing Sheets

GAMIFICATION OF VIDEO CONTENT PRESENTED TO A USER

TECHNICAL FIELD

Embodiments of the subject matter described herein relate generally to systems and methodologies for delivering content (such as video content) over a data communication network. More particularly, embodiments of the subject matter relate to a video content delivery system that supports a video game mode.

BACKGROUND

The prior art includes various media playback devices and media player applications designed to play digital media content (e.g., audio, video, or images). The prior art also includes various video game devices and systems, gaming platforms, and video game authoring tools. Client devices (such as mobile phones, portable computer devices, desktop computer devices, gaming devices, and medical devices) may include media player applications that can play streaming media content, locally stored or recorded media files, and/or media content stored on a tangible memory element such as flash memory, an optical disc, or the like. The presentation of video or audio content can also be supported by vehicle instrumentation panels, tools, system control panels, and the like. Live video streaming services and video on demand (VOD) services allow viewers to obtain television programs, movies, sports, and other types of video content directly over the Internet or a similar network.

BRIEF SUMMARY

Disclosed herein is a method of providing video game functionality that is contextually linked with video program content. Exemplary embodiments of the method involve: causing presentation of a video program at a presentation device; identifying a portion of the video program as a candidate for gamification; processing the identified portion into a video game segment that represents a gamified version of the identified portion; and causing presentation of the video game segment at a playback device.

Also disclosed is a system having at least one processor and at least one processor-readable medium associated with the at least one processor. The at least one processor-readable medium stores processor-executable instructions configurable to be executed by the at least one processor to perform a method of providing video game functionality that is contextually linked with video program content. Exemplary embodiments of the method involve: causing presentation of a video program at a presentation device; identifying a portion of the video program as a candidate for gamification; processing the identified portion into a video game segment that represents a gamified version of the identified portion; and causing presentation of the video game segment at a playback device.

Also disclosed is at least one non-transitory machine-readable storage medium having executable instructions stored thereon. The instructions are configurable to cause at least one processor to perform a method of providing video game functionality that is contextually linked with video program content. Exemplary embodiments of the method involve: causing presentation of a video program at a presentation device; identifying a portion of the video program as a candidate for gamification; processing the identified portion into a video game segment that represents a gamified version of the identified portion; and causing presentation of the video game segment at a playback device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
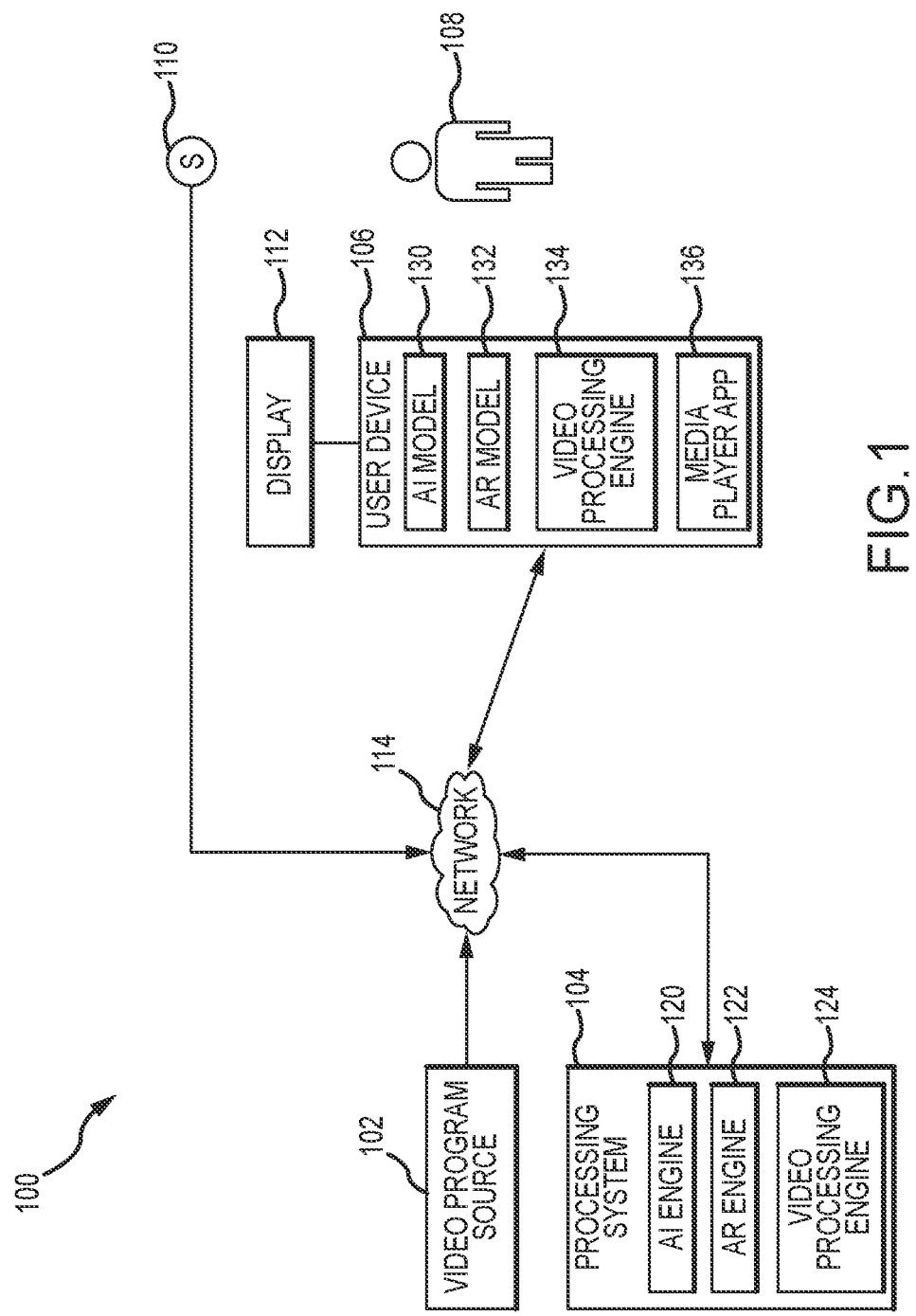
FIG. 1 is a simplified block diagram representation of an exemplary embodiment of a system that supports the delivery of video content and video game features to end users.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software, or the like, various elements of the systems and devices described herein are essentially the code segments or instructions that cause one or more processor devices to perform the various tasks. In certain embodiments, the program or code segments are stored in at least one tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

For the sake of brevity, conventional techniques and methodologies related to signal processing, data transmission and file transfer, signaling, network control, communication systems, video broadcasting systems, video storage, video encoding and decoding, video playback, video game design, augmented reality features, artificial intelligence, machine learning, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter presented here relates to certain features of a media content delivery system (which may be realized as a video services system that supports live and/or on-demand playback of media content, such as a satellite video system, a cable video system, a streaming media system, or the like). More specifically, the disclosed subject matter relates to a video game feature that generates and provides a gamified representation of a user and/or a gamified representation of content conveyed in a video program. The disclosed gamification feature supplements a traditional video program viewing experience with related video game functionality that is contextually linked with at least some content of the video program. For example, a video program of a baseball game can be used as the "seed" of a corresponding video game feature, wherein a segment of the baseball game is gamified for presentation to the end user. Moreover, augmented reality methodologies can be employed (using one or more cameras or other type of user-interrogating sensor) such that the end user can participate in the video game. The disclosed system and operating methodology may leverage a variety of currently available technologies, such as: video game technology; augmented reality technology; artificial intelligence technology; movement or motion detection technology; and video processing technology.

The embodiment described here processes image/video data and renders visual content locally at a user device in connection with one or more augmented reality techniques. Augmented reality techniques and technologies are generally known. Briefly, augmented reality "is an interactive experience of a real-world environment where the objects that reside in the real world are enhanced by computer-generated perceptual information, sometimes across multiple sensory modalities" (as defined by Wikipedia at the time of this writing). In the context of this description, augmented reality technology is associated with the processing and rendering of video game content that is linked with or otherwise related to content contained in a video program.

A media player of the type described herein can be rendered and displayed on any suitably configured display of a user device (e.g., a presentation device, a playback device such as a television system or a set-top box, a client device, a computing device, or a digital media player device). The display can be integrated with a host electronic device, or it can be a distinct component that communicates and cooperates with an electronic device. In certain embodiments, a display can be realized as a removable peripheral component that is compatible with a host electronic device. In yet other embodiments, the display can be implemented with a more complex system, tool, or instrument (such as a vehicle, a piece of manufacturing equipment, an appliance, or the like). In this regard, an electronic device having a display can be realized as any of the following devices, systems, or components, without limitation: a mobile telephone; a personal computer (in any form factor, including a desktop, a laptop, a handheld, etc.); a tablet computing device; a wearable computing device; a video game device or console; a digital media player device; a household appliance; a piece of home entertainment equipment such as a smart television set; a medical device; a navigation device; an electronic toy or game; a vehicle instrument or instrument panel; a control panel of a piece of machinery, a tool, or the like; a digital camera or video camera; a musical instrument; or a remote control device. It should be appreciated that this list is not exhaustive, and it is not intended to limit the scope or application of the embodiments described herein.

Turning now to the drawings, FIG. 1 is a simplified block diagram representation of an exemplary embodiment of a system 100 that is suitably configured to support the techniques and methodologies described in more detail below. The system 100 (which has been simplified for purposes of illustration) generally includes, without limitation: at least one video program source 102 (referred to in the singular form herein for the sake of convenience); a video content and video game processing system 104 coupled to or otherwise associated with the video program source 102; at least one user device 106 that is owned or operated by a user 108; and at least one user interrogation sensor 110 that generates or provides sensor data indicating body motion of the user 108. The at least one user device 106 may include, without limitation: at least one presentation device that is configured and operated to present video programs to the user 108; and/or at least one playback device that is configured and operated to present video game segments to the user 108. In some implementations, the presentation device and the playback device are realized as different and distinct hardware platforms. In other embodiments, the presentation device and the playback device are implemented as a common user device or system, such as a smart television set, a video services receiver, a computer-based video game console, or the like. For simplicity and clarity, FIG. 1 depicts a version of the system 100 that includes a common user device 106 having at least one display 112 associated therewith. A display 112 may be native to the user device 106, or it may be a peripheral component that is coupled to the user device 106 for purposes of receiving and presenting image and video information from the user device 106.

The system 100 includes or cooperates with at least one data communication network 114 that facilitates communication between the various components, systems, and logic utilized by the system 100. For example, the data communication network 114 can be utilized for the communication of media content (e.g., recorded video content, live streaming video content, stored on-demand media content) from the video program source 102 to end user systems (such as the user device 106) as needed. Moreover, the data communication network 114 can be utilized to transfer sensor data from the user interrogating sensor(s) 110 to an appropriate processing device or system, such as the user device 106 and/or the processing system 104.

The data communication network 114 is any digital or other communications network capable of transmitting messages between senders and receivers. In various embodiments, the network 114 includes any number of public or private data connections, links or networks supporting any number of communications protocols. The network 114 may include the Internet, for example, or any other network based upon TCP/IP or other conventional protocols. In various embodiments, the network 114 also incorporates a wireless and/or wired telephone network, such as a cellular communications network for communicating with mobile phones, personal digital assistants, and/or the like. The network 114 may also incorporate any sort of wireless or wired local area networks, such as one or more IEEE 802.3 and/or IEEE 802.11 networks. In practice, the system 100 may cooperate with and leverage any number of wireless and any number of wired data communication networks maintained or operated by various entities and providers. Accordingly, communication between the various components of the system 100 may involve multiple network links and different data communication protocols. In this regard, the network 114 can include or cooperate with any of the following, without limitation: a local area network; a wide area network; the Internet; a personal area network; a near-field data communication link; a cellular communication network; a satellite communication network; a video services or television broadcasting network; a network onboard a vehicle; or the like. The components of the system 100 may be suitably configured to support a variety of wireless and wired data communication protocols, technologies, and techniques as needed for compatibility with the network 114.

The video program source 102 represents any suitably configured system, device, and/or computer-readable storage element that is capable of delivering or otherwise providing video program content to the user device 106. The video program source 102 may be implemented to provide storage of on-demand video content and/or live video program content. Although only one video program source 102 is depicted in FIG. 1, an embodiment of the system 100 can include more than one video program source 102 to service different geographical regions, locales, time zones, or the like. In certain embodiments of the system 100, the video program source 102 is implemented as a native component, subsystem, or element of the user device 106. For example, the video program source 102 may be realized as a processor-readable storage element that is native to the user device 106 (e.g., an onboard memory component, a portable memory card, or a removable storage drive).

In practice, the video program source 102 may be realized as a network server device, a component that resides in the user's local network, a digital video recorder (DVR) device, a hard drive of a computer system, a network attached storage (NAS) device, an edge server of a content delivery network (CDN), or the like. In this regard, the video program source 102 may be deployed as a head end facility and/or a satellite uplink facility for the system 100. In some embodiments, the video program source 102 may include or cooperate with one or more web-based content delivery applications, services, or providers. To this end, the video program source 102 may function to control content, signaling data, programming information, and other data sent to any number of receiving components.

The video program source 102 may include or cooperate with a suitably configured storage architecture, which may be realized with one or more hardware components, memory storage devices (e.g., hard disk drives or solid state memory), database systems, or the like. The storage architecture is configured, maintained, and operated to store on-demand media content for on-demand playback via at least one data communication link of the network 114. In practice, an embodiment of the video program source 102 may include or cooperate with any number of storage elements or databases as needed to store media content (including video programming) for the volume of end users or subscribers supported by the system 100.

The processing system 104 may be implemented as a network-based or cloud-based computing system that is configured, programmed, and operated in an appropriate manner to support the methodologies described herein (in particular, the techniques and methodologies related to the processing of video program content and video game content). In certain embodiments, the processing system 104 includes or cooperates with an artificial intelligence (AI) engine 120, an augmented reality (AR) engine 122, and a video processing engine 124, wherein each engine represents the processing power and computer-driven logic related to the respective function. Accordingly, the AI engine 120 is responsible for performing various AI tasks that support the functionality of the system 100, the AR engine 122 is responsible for performing various AR tasks that support the functionality of the system 100, and the video processing engine 124 is responsible for performing various video processing tasks that support the functionality of the system 100.

The user device 106 may be realized in any number of different ways, and it may be suitably configured as needed to perform any number of desired functions, such as the presentation of audio content, video content, or audio-visual content. For example, the user device 106 may be implemented as any of the following, without limitation: a computing device; a video game device; a smartphone; a tablet device; an electronic medical device; a household or other electronic appliance; a digital media player device; a digital media place-shifting device; a television set; a set top box for a video services receiver; stereo or other entertainment equipment; an alarm clock; a wearable device; a vehicle entertainment system; or the like. These examples are not intended to limit or otherwise restrict the scope of the embodiments described herein.

The user device 106 may be configured, programmed, and operated in an appropriate manner to support the methodologies described herein (in particular, the techniques and methodologies related to the processing and presentation of video program content and video game content). In certain embodiments, the user device 106 includes or utilizes an AI model 130, an AR model 132, a video processing engine 134, and a media player application 136. The AI model 130, which may be influenced or determined by the AI engine 120, supports or contributes to various AI tasks associated with the functionality of the system 100. To this end, the AI engine 120 can generate, maintain, and update the AI model 130 as needed, and provide updates to the AI model 130 to the user device 106 at appropriate times. Accordingly, the AI engine 120 may be configured for adaptive and dynamic training and learning for purposes of refining and optimizing the AI model 130. The AR model, which may be influenced or determined by the AR engine 122, supports or contributes to various AR tasks associated with the functionality of the system 100. To this end, the AR engine 122 can generate, maintain, and update the AR model 132 as needed, and provide updates to the AR model 132 to the user device 106 at appropriate times. Accordingly, the AR engine 122 may be configured for adaptive and dynamic training and learning for purposes of refining and optimizing the AR model 132. The video processing engine 134 and the media player application 136 are responsible for performing various video processing and presentation tasks that support the functionality of the system 100.

If the user device 106 includes sufficient native processing power, processing speed, and memory resources, then a cloud-based AI engine 120 and a cloud-based AR engine 122 need not be involved. In such a deployment, the native processing capability of the user device 106 can support the various AI and AR processing tasks described here, and can update and refine the AI model 130 and the AR model 132 in an independent manner.

The user device 106 may be implemented as computer-based or processor-based electronic device having appropriate supporting applications installed thereon. For example, the media player application 136 supports the playback of video program content, which can be provided by the video program source 102. Alternatively or additionally, the media player application 136 supports the playback of stored on-demand media content, which can be locally stored at the user device 106 or remotely stored for access via the network 114. The video processing engine 134 and the media player application 136 may also be suitably designed and configured to support the processing, rendering, and presentation of video game content and features at the user device 106.

The user interrogation sensor 110 collects sensor data that indicates body motion, movement, and/or position of the user 108. The captured sensor data is provided to the processing system 104 and/or to the user device 106 for appropriate analysis and handling. In certain deployments of the system 100, the sensor 110 is realized as a camera to capture image data (still images and/or video). In such deployments, one or more cameras are configured, positioned, and operated with the user 108 in the field of view, such that body movements, motion, and activity of the user 108 can be captured for analysis. A camera may be incorporated into the user device 106 as a native feature. Alternatively or additionally, a camera may be realized as a peripheral device that is distinct from the user device 106. Alternatively or additionally, a camera may be incorporated into a device other than the user device 106, such as a separate laptop or tablet computer device, a separate display or monitor, a smart television set, or a video services set-top box.

A camera utilized by the system is configured to capture images (still and/or video images) in accordance with well-established digital imaging technologies. For reasons that will become apparent from the following description, the camera is either a forward facing camera or is designed such that it can function as a user-capturing camera in at least one operating mode. Accordingly, images obtained by the camera can be rendered on the display 112 in real time (or in substantially real time such that any delay perceived by the user 108 is insignificant). As explained in more detail below, the camera and the display 112 cooperate to support augmented reality procedures related to the system 100.

In certain deployments of the system 100, the user interrogation sensor 110 is realized as a lidar sensor to capture lidar data that is generated in response to interrogation of the user 108. In such deployments, one or more lidar sensors are configured, positioned, and operated with the user 108 in the field of view, such that body movements, motion, and activity of the user 108 can be captured for analysis. A lidar sensor may be incorporated into the user device 106 as a native feature. Alternatively or additionally, a lidar sensor may be realized as a peripheral device that is distinct from the user device 106. Alternatively or additionally, a lidar sensor may be incorporated into a device other than the user device 106, such as a separate laptop or tablet computer device, a separate display or monitor, a smart television set, or a video services set-top box.

In some implementations, the system 100 includes or cooperates with user-worn or user-carried sensors that provide additional sensor data that indicates movement, motion, and/or body position of the user. For example, the user 108 may wear or carry a peripheral device that includes an accelerometer, a gravity meter, a gyroscope, an altimeter, a global positioning system receiver, or the like.

Figure 2:
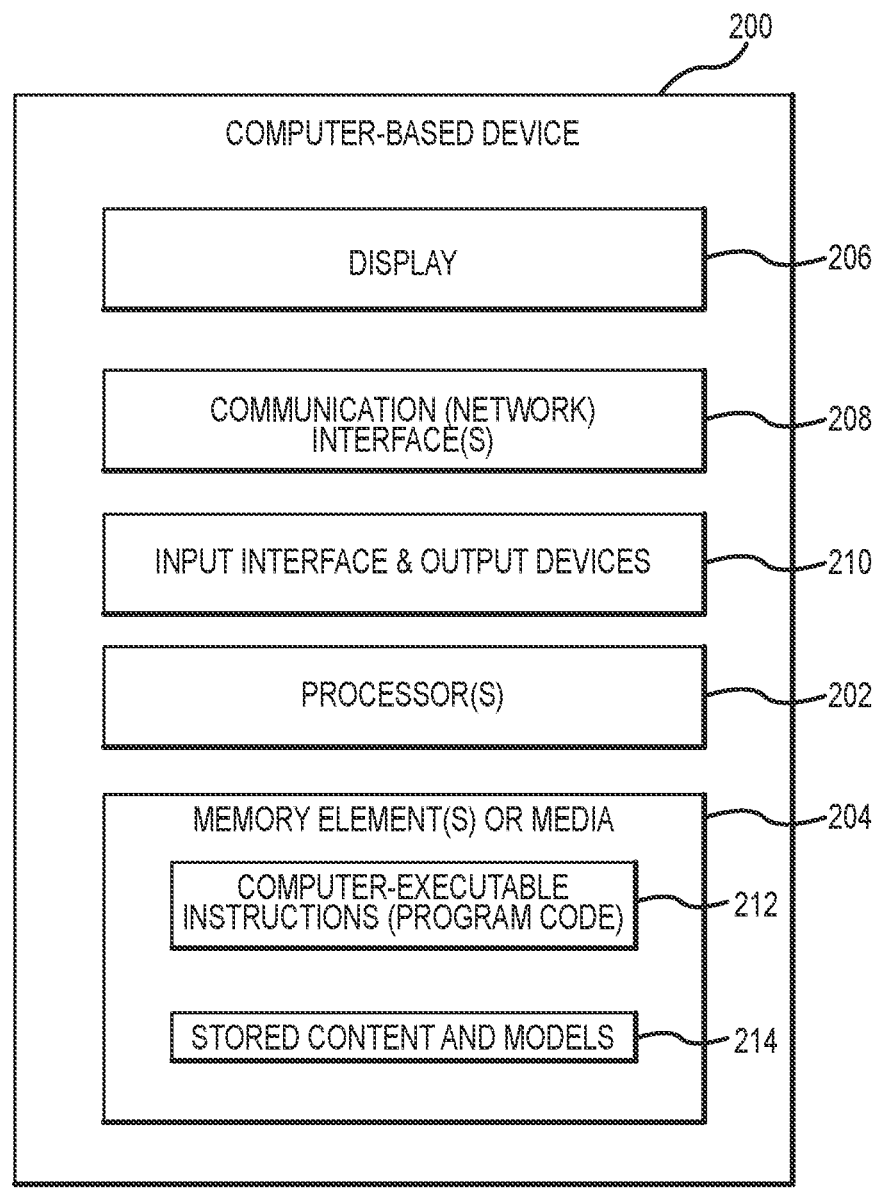
FIG. 2 is a simplified block diagram representation of an exemplary embodiment of a computer-based device.

In accordance with certain embodiments, any of the hardware components shown in FIG. 1 can be implemented as a computer-based or a processor-based device, system, or piece of equipment. Thus, the video program source 102, the processing system 104, the user device 106 and/or the sensor 110 may be realized as an electronic processor-driven component. In this regard, FIG. 2 is a simplified block diagram representation of an exemplary embodiment of a computer-based device 200, which may be used to implement any of the devices or systems shown in FIG. 1.

The device 200 generally includes, without limitation: at least one processor 202; at least one memory storage device, storage media, or memory element 204; a display 206; at least one communication (network) interface 208; and input and output (I/O) devices 210, such as an input interface, one or more output devices, one or more human/machine interface elements, or the like. In practice, the device 200 can include additional components, elements, and functionality that may be conventional in nature or unrelated to the particular media playback and content uploading functionality described here.

A processor 202 may be, for example, a central processing unit (CPU), a field programmable gate array (FPGA), a microcontroller, an application specific integrated circuit (ASIC), or any other logic device or combination thereof. One or more memory elements 204 are communicatively coupled to the at least one processor 202, and can be implemented with any combination of volatile and non-volatile memory. The memory element 204 has non-transitory machine-readable and computer-executable instructions (program code) 212 stored thereon, wherein the instructions 212 are configurable to be executed by the at least one processor 202 as needed. When executed by the at least one processor 202, the instructions 212 cause the at least one processor 202 to perform the associated tasks, processes, and operations defined by the instructions 212. Of course, the memory element 204 may also include instructions associated with a file system of the host device 200 and instructions associated with other applications or programs. Moreover, the memory element 204 can serve as a data storage unit for the host device 200. For example, the memory element 204 can provide a storage buffer for images (e.g., video frame thumbnails, selected screenshots, or the like) and/or for video content that is presented by the device 200. In certain embodiments, the memory element 204 is used to maintain stored media content and models 214 that can be accessed and utilized by the device 200. For example, the user device 106 shown in FIG. 1 may use a stored AI model 130 and/or a stored AR model 132.

The display 206 may be integrated with the device 200 or communicatively coupled to the device 200 as a peripheral or accessory component. The shape, size, resolution, and technology of the display 206 will be appropriate to the particular implementation of the device 200. The display 206 can be realized as a monitor, touchscreen, or another conventional electronic display that is capable of graphically presenting data and/or information provided by the device 200. The display 206 is communicatively coupled to the at least one processor 202, and it can leverage existing technology to detect touch gestures and contact with a user's finger (or fingers), a stylus, or the like.

The communication interface 208 represents the hardware, software, and processing logic that enables the device 200 to support data communication with other devices. In practice, the communication interface 208 can be suitably configured to support wireless and/or wired data communication protocols as appropriate to the particular embodiment. For example, if the device 200 is a smartphone, then the communication interface 208 can be designed to support a cellular communication protocol, a short-range wireless protocol (such as the BLUETOOTH communication protocol), and a WLAN protocol. As another example, if the device 200 is a desktop or laptop computer, then the communication interface can be designed to support the BLUETOOTH communication protocol, a WLAN protocol, and a LAN communication protocol (e.g., Ethernet). In practice, the communication interface 208 enables the device 200 to receive media content for presentation on the display 206, wherein the media content can be downloaded, streamed, or otherwise provided for playback or for storage at the device 200.

The I/O devices 210 enable the user of the device 200 to interact with the device 200 as needed. In practice, the I/O devices 210 may include, without limitation: an input interface to receive media content for handling by the device 200; a speaker, an audio transducer, or other audio feedback component; a haptic feedback device; a microphone; a mouse or other pointing device; a touchscreen or touchpad device; a keyboard; a joystick; a biometric sensor or reader (such as a fingerprint reader, a retina or iris scanner, a palm print or palm vein reader, etc.); a camera; a lidar sensor; or any conventional peripheral device. In this context, a touchscreen display 206 can be categorized as an I/O device 210. Moreover, a touchscreen display 206 may incorporate or be controlled to function as a fingerprint or palm print scanner. A haptic feedback device can be controlled to generate a variable amount of tactile or physical feedback, such as vibrations, a force, knock, or bump sensation, a detectable movement, or the like. Haptic feedback devices and related control schemes are well known and, therefore, will not be described in detail here.

This description assumes that an electronic device of the type described above can be operated to present media content to a user. The source, format, and resolution of the media content are unimportant for purposes of this description. Indeed, the data that conveys the media content can be locally stored at the electronic device, or it can be provided in an on-demand streaming media format from a content source, a service provider, a cloud-based entity, or the like. The following description assumes that the user device 106 and its installed media player application 136 can successfully and compatibly process, render, and display the desired media (video) content in an appropriate manner.

Figure 3:
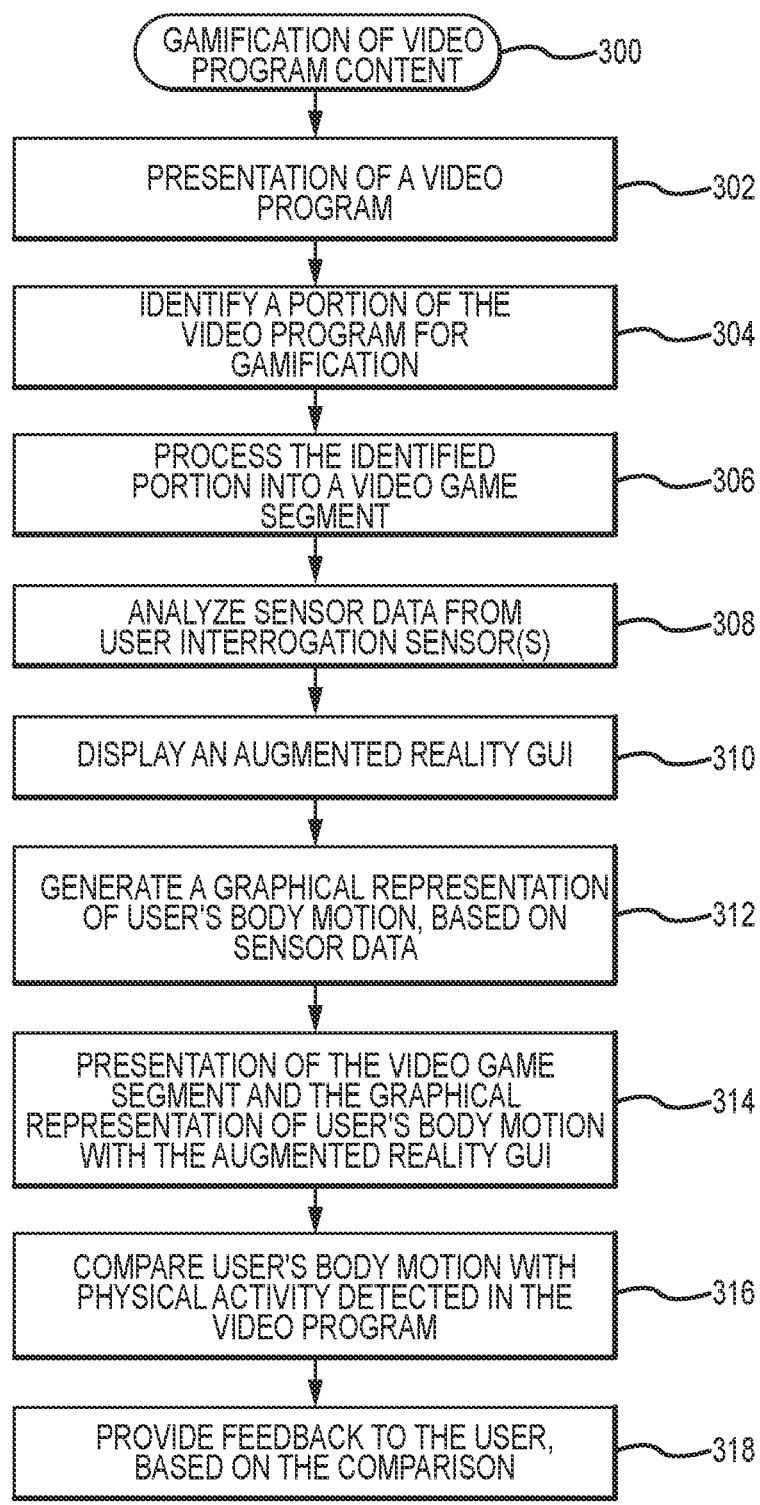
FIG. 3 is a flow chart that illustrates an exemplary embodiment of a process that gamifies video program content.

FIG. 3 is a flow chart that illustrates an exemplary embodiment of a process 300 that gamifies video program content. The process 300 represents one exemplary embodiment of a method of providing video game functionality that is contextually linked with video program content. The various tasks performed in connection with the process 300 may be performed by software, hardware, firmware, or any combination thereof. For illustrative purposes, the following description of the process 300 may refer to elements mentioned above in connection with FIG. 1 and FIG. 2. In practice, portions of the process 300 may be performed by different elements of the described system, e.g., different devices or systems and/or one or more processors native to any number of different components. It should be appreciated that the process 300 may include any number of additional or alternative tasks, the tasks shown in FIG. 3 need not be performed in the illustrated order, and the process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

The process 300 may be performed during a video game mode of operation, which may be activated while the video program is paused or stopped, or after the video program ends. Alternatively, the video game mode can be entered while the video program continues to play in the background or on a different device. The following description assumes that the video game mode is launched at an appropriate time by the user.

In accordance with the illustrated embodiment, the process 300 causes the presentation of a video program at a presentation device (task 302). The video program may be a live broadcast or stream, or it may be a stored or recorded on-demand program. The process 300 continues by identifying a portion of the video program as a candidate for gamification (task 304). In this regard, the identified portion can include any or all of the following, without limitation: a distinguishable type of physical activity; a detectible event; a discernable character, actor, location, or scenery; interesting content, a highlight, or important play (of a sporting event); and a designated form of body motion, movement, or gesture. In certain embodiments, the identifying at task 304 detects that the portion of the video program includes a distinguishable type of physical activity (performed by an athlete, an actor, a character or entity, or any moving object shown in the video program).

Although not always required, the example described here assumes that the video program relates to a sporting event (e.g., a football/soccer match) and that the distinguishable type of physical activity corresponds to an action performed by a participant of the sporting event, such as one of the players kicking a goal. In other scenarios, the distinguishable type of physical activity can be, for example: a baseball player hitting a baseball; a basketball player shooting a basketball; a tennis player hitting a tennis ball; a bowler throwing a bowling ball; a cricket batsman hitting a cricket ball; a dancer performing a specific dance move; a yoga instructor performing a specific yoga movement; a martial artist performing a specific martial arts form; etc. It should be noted that the identified portion of the video program need not involve human activity. Instead, the identified portion of the video program may include physical activity or motion of an inanimate object, an animal, a fictional character, monster, or entity, or the like.

The identifying at task 304 may utilize any number of analytical tools, algorithms, or processing engines. For example, an AI engine (such as the AI engine 120 shown in FIG. 1) could be employed in conjunction with a video processing engine (such as the video processing engine 124 shown in FIG. 1) to analyze content of the video program of interest for purposes of determining whether an event or a segment of the video program might be a candidate for gamification. In the context of a sporting event, the identifying at task 304 may leverage a scorekeeping service or application that monitors changes to the score or status of the sporting event (assuming that scoring events are good candidates for gamification). Alternatively or additionally, the process 300 could leverage optical character recognition technology for purposes of monitoring changes to the score or status of the sporting event, wherein a scorecard, scoreboard, or graphical window of the video program is monitored for score changes. The identifying at task 304 may also determine an appropriate beginning and ending of the video segment of interest, for purposes of gamification. For example, if task 304 detects the occurrence of a scoring event (e.g., a kicked goal), then it may be appropriate to consider a start time that is at least several seconds before the time of the detected goal and an end time that is at least several second after the time of the detected goal. The designated window of time for the portion of the video program is selected to ensure that all of the physical activity of interest will be captured and considered for gamification. Accordingly, the designated window of time can be longer or shorter as appropriate for the particular type of physical activity that is to be gamified. Moreover, identifying data, metadata, and/or program descriptor data can be used as a tool for determining how best to identify the window of time for a known video program.

The process 300 may continue by processing the identified portion of the video program into a video game segment that represents a gamified version of the identified portion (task 306). As one non-limiting example, the processing at task 306 digitizes or otherwise converts the distinguishable type of physical activity into an animated representation for use with the video game segment. In this regard, the processing at task 306 may convert an excerpt of the video program (e.g., a player kicking a goal) into a format suitable for rendering and presentation with a video game played by the user. The animated representation may be a realistic rendering obtained via computer-generated imagery (CGI) technology, a simplified "cartoon" representation, or the like. The animated representation can be utilized in various ways in the context of a video game. For example, the animated representation may be presented as a simple replay of the captured video segment, or it can serve as a tutorial for the user to emulate. As another example, some or all of the animated representation may be superimposed with a video of the user and/or with a digitized representation of the user. As yet another example, some or all of the animated representation may be utilized in an augmented reality graphical user interface generated by the system. Ultimately, the process 300 causes the presentation of at least some portion of the generated video game segment at a suitable playback device, such as the user device 106 shown in FIG. 1.

As mentioned above, the process 300 monitors the video program, identifies certain segments of the video program, and gamifies the identified segments for use in a video game mode. In certain embodiments of the system 100, augmented reality features are incorporated into the video game mode to enable the user to personally engage with the video game. To this end, the process 300 may obtain and analyze sensor data from at least one user interrogation sensor (task 308). As explained above, the sensor data indicates body motion, movement, and/or positioning of the user. Although not always required, this example assumes that at least one camera captures image data for analysis. The image data can be processed in an appropriate manner to generate an augmented reality graphical user interface (GUI) at the playback device. In this regard, the process 300 continues by causing the display of the augmented reality GUI at the playback device during the video game mode (task 310).

The augmented reality GUI may include, without limitation: any or all of the image/video content obtained from the user interrogation sensor; any or all of the image/video content of the identified video program segment; a digitized, animated, or otherwise converted representation of any or all of the image/video content obtained from the user interrogation sensor; and/or a digitized, animated, or otherwise converted representation of any or all of the image/video content of the identified video program segment. In certain implementations, the augmented reality GUI includes a realistic graphical representation of the body motion of the user (e.g., an actual video capture of the user or a realistic digitized version thereof), at least some graphical content contained in the video game segment, and supplemental animated content that is influenced by the graphical representation of the body motion of the user. The graphical content contained in the video game segment may be actual image or video content or a digitized version thereof. The graphical content contained in the video game segment may include, without limitation: an athlete or character; a moving object that appears in the video program; a section of a sports field, area, stadium, or venue; background scenery that appears in the video program; a vehicle or other type of equipment; buildings; or environmental features such as trees, plants, the sky, an ocean, or the like. In certain embodiments, the system 100 may be populated with some visual content that can be used for graphical content in the video game segment. For example, the system 100 may have prior knowledge of: the location of a sports venue; the time of day when an event of interest is scheduled; the weather; advertisements, posters, or promotional posters, signs, or banners in the sports venue; the appearance of the people in the video program (e.g., height, weight, age, hair color, eye color, hair style, gender); uniforms worn by athletes; sports team names or colors; and the like. Known graphics, images, or video content can be accessed and utilized when generating the video game segment.

Supplemental animated content (which may appear in the augmented reality GUI) refers to any additional graphical content, feature, or element that is related to the user's monitored activity. In this regard, the movement, positioning, and/or dynamic characteristics of the supplemental animated content can be influenced by, determined by, or controlled by the detected body motion of the user. This type of supplemental content is distinguishable from related content, data, or statistics that might be displayed in connection with content of the video program (e.g., a score or player statistics) or displayed in connection with the game play mode (e.g., a score or grade for the video game activity, game play statistics for the user, information related to the user's gamified movement, etc.). For example, the supplemental animated content may include any or all of the following, without limitation: a ball that moves in response to a kicking movement of the user; a baseball that moves in response to a throwing or batting movement of the user; a dart that flies in response to an arm motion of the user; or a golf ball that travels in response to a golf club swinging action of the user.

The illustrated embodiment of the process 300 generates a graphical representation of the body motion of the user from at least some of the sensor data obtained from the user interrogating sensor, e.g., image data, lidar data, or the like (task 312). In certain embodiments, the graphical representation of the user leverages the actual image/video data captured by at least one camera focused on the user. In other embodiments, the graphical representation of the user is a digitized or animated version that is derived from the sensor data. The graphical representation of the user may be an animated version that is based on actual images captured by a plurality of cameras, such that different viewing angles, panning, rotation, elevation changes, and three dimensional effects can be realized. These different "special effects" can be achieved using the actual image data rather than digitized or animated versions of the same.

The process 300 continues by presenting the video game segment at a playback device, such as the user device 106 shown in FIG. 1 (task 314). The video game segment may be presented by itself or in connection with the augmented reality GUI. This example assumes that at least some of the video game segment and the graphical representation of the body motion of the user are presented with the augmented reality GUI (task 314). To this end, the graphical representation of the body motion of the user and the graphical representation of the moving object can be superimposed in the augmented reality GUI. In certain implementations, the graphical representation of the body motion of the user and the corresponding animated representation of the detected physical activity (contained in the video program) are superimposed in the augmented reality GUI, for purposes of comparison. Accordingly, the process 300 may compare the user's body motion with the physical activity that was detected in the video program (task 316) and provide feedback to the user, based on the comparison (task 318). For example, if the detected activity is a player kicking a goal, then the player's kicking movement and technique can be compared to the user's simulated attempt, and feedback, coaching, and/or tips for improvement can be provided to the user. The user feedback may include a congratulatory or motivating message, statistics related to the user's activity, a score, grade, or evaluation of the user's activity, a metric related to how well the user's attempt matches the activity contained in the source video program, audio feedback, etc.

Figure 4:
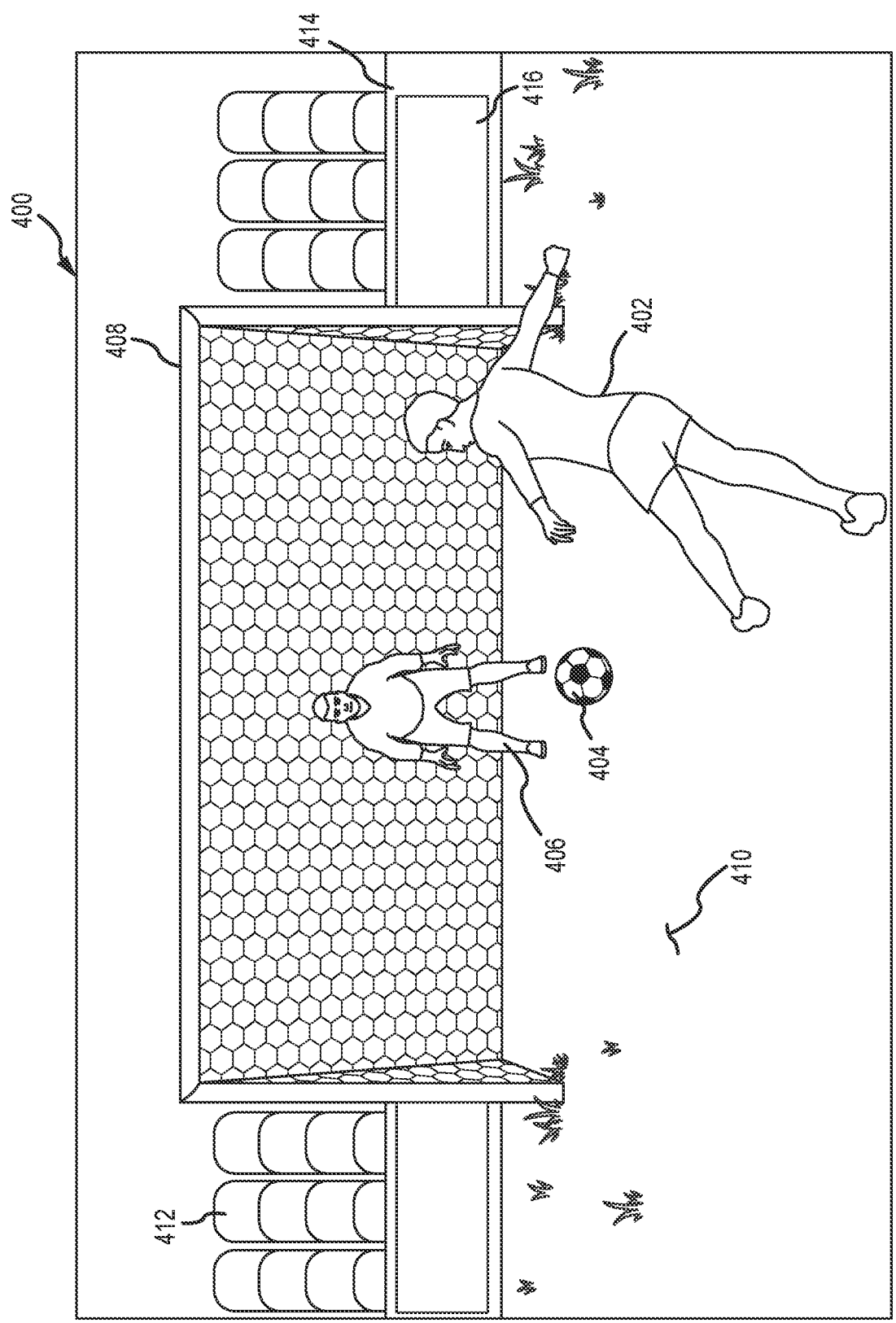
FIG. 4 is an illustration that represents a screen capture of a video program related to a sporting event.
Figure 5:
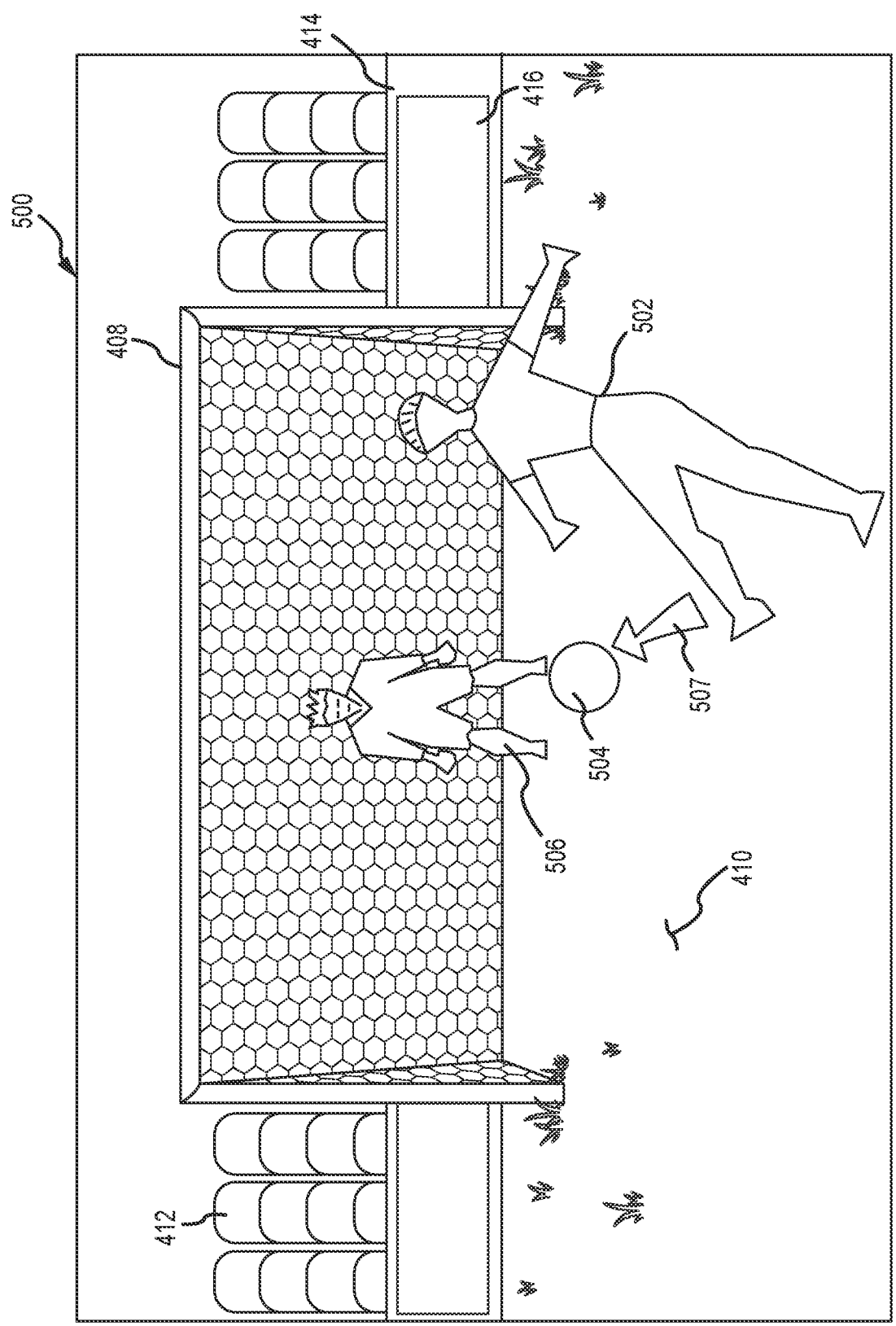
FIG. 5 is an illustration that represents a gamified version of the screen capture shown in FIG. 4.
Figure 6:
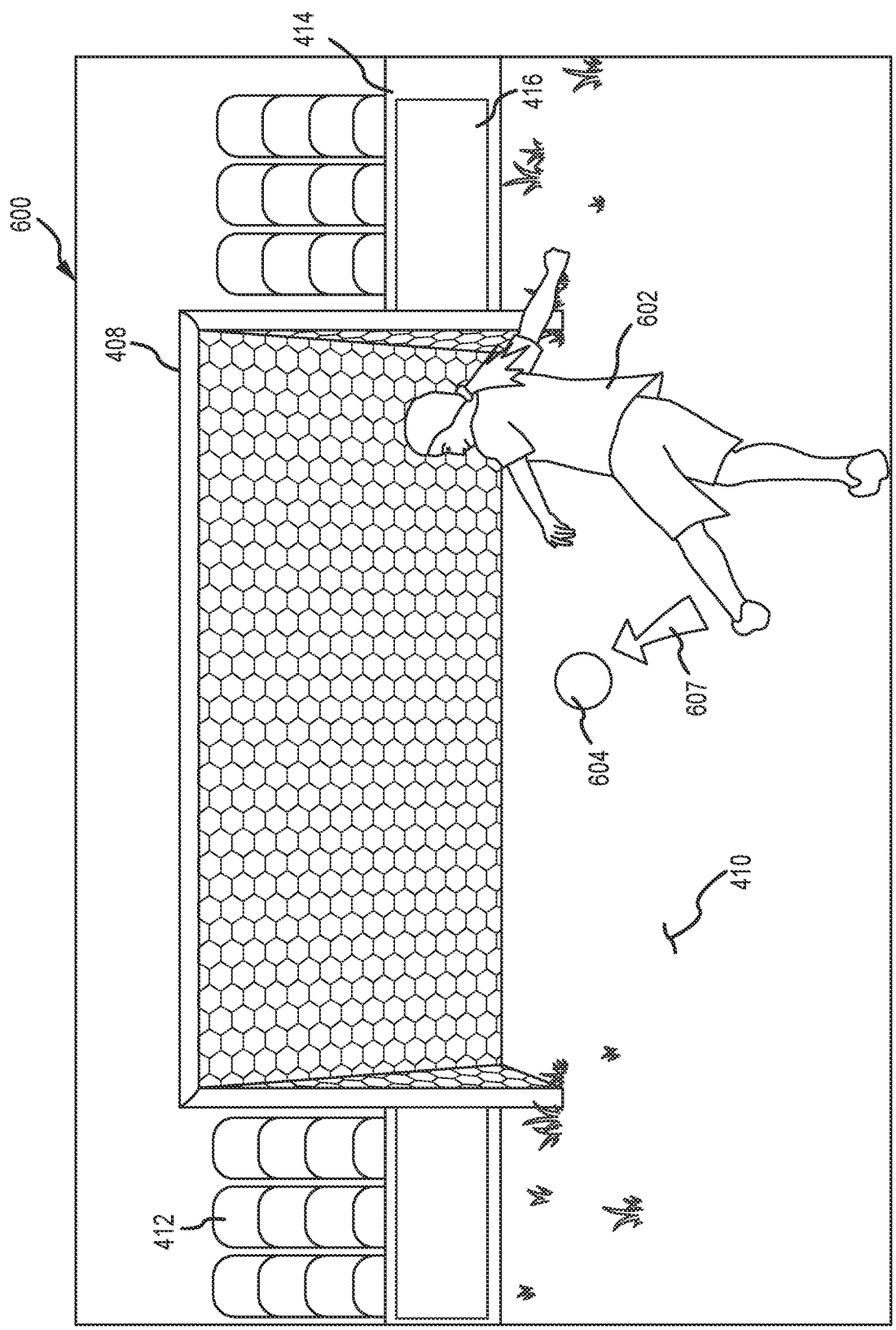
FIG. 6 is an illustration that represents another gamified version of the screen capture shown in FIG. 4.

FIGS. 4-6 are illustrations that depict one non-limiting example of how a segment of a video program can be gamified for inclusion in an augmented reality GUI. FIG. 4 is an illustration that represents a screen capture 400 of a video program related to a football/soccer match. The screen capture 400 includes the actual image/video data from the video program. The screen capture 400 depicts the following content: a player 402 kicking a ball 404; a player 406 defending a goal 408; a playing field 410; spectator seating 412; a retaining fence 414; and signage 416. Of course, the actual identified segment of the video program may begin several seconds before the player 402 kicks the ball 404, and may end several seconds after the player 402 kicks the ball 404.

FIG. 5 is an illustration that represents a gamified version 500 of the screen capture 400 shown in FIG. 4. For this example, the gamified version 500 includes digitized representations of the player 402, the ball 404, and the player 406, with the remaining content being realistic (as shown in FIG. 4). Accordingly, FIG. 5 depicts a digitized player 502, a digitized ball 504, and a digitized player 506. These digitized versions may appear somewhat realistic or obviously simulated, depending on the particular implementation. The gamified version 500 also includes an animated ball flight trace 507 that tracks the movement of the digitized ball 504. In alternative embodiments, all of the graphical content of the gamified version 500 corresponds to digitized versions of the realistic content contained in the screen capture 400. In practice, the identified portion of the video program is gamified—FIG. 5 depicts only one frame of the gamified segment.

FIG. 6 is an illustration that represents another gamified version of the screen capture 400 shown in FIG. 4. For this example, the gamified version 600 leverages augmented reality technology to insert the user into the scene. The gamified version 600 includes digitized representations of the ball 604 and its ball flight trace 607, with the remaining content being realistic (as shown in FIG. 4). For this example, the defending player (the goalie) is not included in the gamified version. Notably, the gamified version 600 includes a graphical representation of the user 602 performing the kick. In certain embodiments, the graphical representation of the user 602 is generated from the actual image/video data captured for the user. The movement of the digitized ball 604 and the appearance of the ball flight trace 607 are determined by the user's actual kicking movement, as captured by the user interrogating sensor(s). Consequently, this augmented reality GUI can be generated in real-time or substantially real-time to superimpose a live video capture of the user onto a realistic or animated version of the playing field contained in the video program. From the user's perspective, it will appear as though they are standing on the playing field 410 while attempting to kick the digitized ball 604 into the goal 408. In alternative implementations, everything in the gamified version 600 is digitized or animated (except the graphical representation of the user 602, which remains realistic and based on the user interrogation sensor data).

The gamification techniques and methodologies presented here can be utilized to improve the user experience, and to provide engaging entertainment related to the content of a video program. Although an example related to a sporting event has been described, the gamification techniques and methodologies can also used for other use cases, such as training, teaching, exercise, physical therapy, and the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of providing video game functionality that is contextually linked with video program content, the method comprising:
    causing presentation of a video program at a presentation device;
    identifying a portion of the video program as a candidate for gamification, wherein the identifying step detects that the portion of the video program includes a distinguishable type of physical activity;
    processing the identified portion into a video game segment that represents a gamified version of the identified portion, wherein the processing step digitizes the distinguishable type of physical activity into an animated representation for the video game segment; and causing presentation of the video game segment at a playback device.

2. The method of claim 1, wherein:
the video program relates to a sporting event; and
the distinguishable type of physical activity corresponds to an action performed by a participant of the sporting event.

3. The method of claim 1, further comprising:
analyzing sensor data from at least one user interrogation sensor, the sensor data indicating body motion of a user; and
causing display of an augmented reality graphical user interface (GUI) at the playback device;
wherein the augmented reality GUI comprises:
a graphical representation of the body motion of the user;
at least sonic graphical content contained in the video game segment; and
supplemental animated content that is influenced by the graphical representation of the body motion of the user.

4. The method of claim 3, wherein the at least some graphical content contained in the video game segment comprises background scenery that appears in the video program.

5. The method of claim 3, wherein the at least some graphical content contained in the video game segment comprises a graphical representation of a moving object that appears in the video program.

6. The method of claim 5, wherein the graphical representation of the body motion of the user and the graphical representation of the moving object are superimposed in the augmented reality GUI.

7. The method of claim 3, wherein:
the at least one user interrogation sensor comprises a camera;
the sensor data comprises image data captured by the camera; and
the method further comprises the step of generating the graphical representation of the body motion of the user from at least some of the image data.

8. The method of claim 3, wherein:
the at least one user interrogation sensor comprises a lidar sensor;
the sensor data comprises lidar data captured by the lidar sensor; and
the method further comprises the step of generating the graphical representation of the body motion of the user from at least some of the lidar data.

9. A system comprising:
at least one processor; and
at least one processor-readable medium associated with the at least one processor, the at least one processor-readable medium storing processor-executable instructions configurable to be executed the at least one processor to perform a method of providing video game functionality that is contextually linked with video program content, the method comprising:
causing presentation of a video program at a presentation device:
identifying a portion of the video program as a candidate for gamification.;
processing the identified portion into a video game segment that represents a gamified version of the identified portion;
causing presentation of the video game segment at a playback device:
analyzing sensor data from at least one user interrogation sensor, the sensor data indicating body motion of a user; and
causing display of an augmented reality graphical user interface (GUI) at the playback device, wherein the augmented reality GUI comprises:
a graphical representation of the body motion of the user;
at least some graphical content contained in the video game segment; and
supplemental animated content that is influenced by the graphical representation of the body motion of the user.

10. The system of claim 9, wherein the identifying step detects that the portion of the video program includes a distinguishable type of physical activity.

11. The system of claim 9, wherein:
the at least some graphical content contained in the video game segment comprises a graphical representation of a moving object that appears in the video program; and
the graphical representation of the body motion of the user and the graphical representation of the moving object are superimposed in the augmented reality GUI.

12. The system of claim 9, wherein:
the at least one user interrogation sensor comprises a camera;
the sensor data comprises image data captured by the camera; and
the method further comprises the step of generating the graphical representation of the body motion of the user from at least some of the image data.

13. The system of claim 9, wherein:
the at least one user interrogation sensor comprises a lidar sensor;
the sensor data comprises lidar data captured by the lidar sensor; and
the method further comprises the step of generating the graphical representation of the body motion of the user from at least some of the lidar data.

14. The system of claim 9 wherein the presentation device and the playback device are implemented as a common user device.

15. At least one non-transitory machine-readable storage medium having executable instructions stored thereon, the instructions configurable to cause at least one processor to perform a method of providing video game functionality that is contextually linked with video program content, the method comprising:
causing presentation of a video program at a presentation device;
identifying a portion of the video program as a candidate for gamification;
processing the identified portion into a video game segment that represents a gamified version of the identified portion;
causing presentation of the video game segment at a playback device:
analyzing sensor data from at least one user interrogation sensor, the sensor data indicating body motion of a user; and
causing display of an augmented reality graphical user interface (GUI) at the playback device, wherein the augmented reality GUI comprises:
a graphical representation of the body motion of the user;
at least some graphical content contained in the video game segment; and supplemental animated content that is influenced by the graphical representation of the body motion of the user.

16. The storage medium of claim 15, wherein:
the at least some graphical content contained in the video game segment comprises a graphical representation of a moving object that appears in the video program; and
the graphical representation of the body motion of the user and the graphical representation of the moving object are superimposed in the augmented reality GUI.

* * * * *